Figure 1:
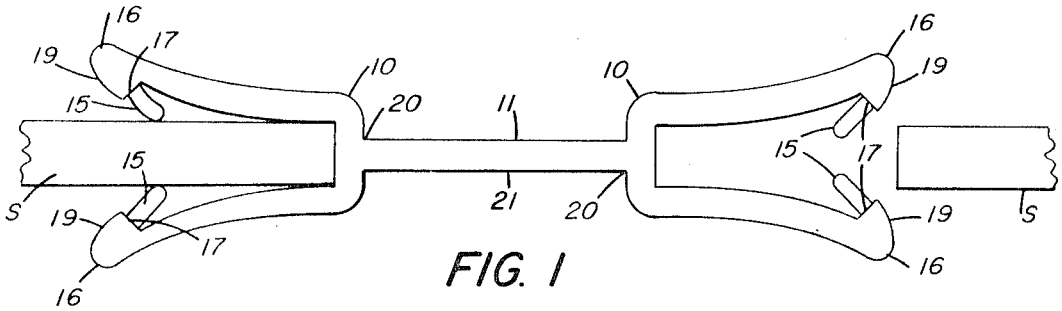
Figure 3:
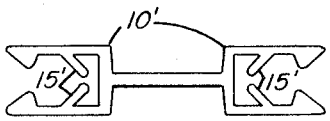
Figure 2:
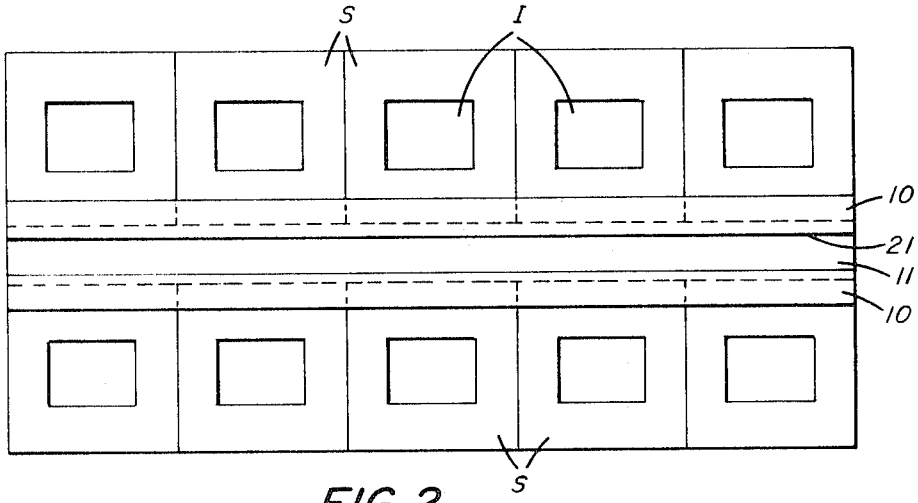

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 17, 1973

909 O.G. 794

T909,013
SLIDE STICK

Arthur C. Rissberger, Jr., Webster, N.Y.
(1669 Lake Ave., Rochester, N.Y. 14650)

Filed Nov. 10, 1971, Ser. No. 197,352
**Int. Cl. G09f *1/10***
U.S. Cl. 40—158
1 Sheet Drawing. 12 Pages Specification

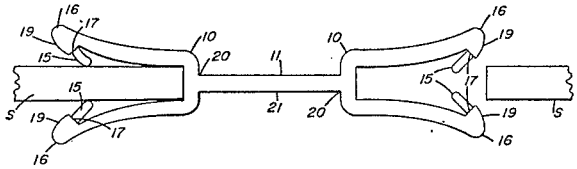

A slide stick for returning a customer's processed and slide mounted transparencies so that a plurality of them can be simultaneously viewed by transmitted light without having to handle the slides individually. The slide stick preferably comprises two elongated substantially U-shaped channel sections connected in back-to-back relation by a web. A plurality of slides are inserted edgewise into each channel section in side-by-side relation and are frictionally held in place by resilient fingers extruding inwardly from each channel wall and rearwardly of the channels. The sticks are preferably of such length that two sticks will accommodate the number of slides obtained from a single roll of film, i.e. 12 or 20. The stick is preferably plastic and formed by a dual durometer extrusion technique, the channel sections and the web connecting them being formed of a plastic having a durometer hardness which renders these parts fairly rigid and the fingers formed from a plastic having a durometer hardness which makes them resilient.

April 17, 1973 A. C. RISSBERGER, JR T909,013

SLIDE STICK

Filed Nov. 10, 1971

ARTHUR C. RISSBERGER, JR
INVENTOR.

BY

ATTORNEY